(12) United States Patent
Guedalia et al.

(10) Patent No.: US 9,479,604 B2
(45) Date of Patent: Oct. 25, 2016

(54) SYSTEM AND METHOD FOR DYNAMIC PHONE BOOK AND NETWORK CONTENT LINKS IN A MOBILE DEVICE

(75) Inventors: Isaac David Guedalia, Bet Shemesh (IL); Jacob Guedalia, Newton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1580 days.

(21) Appl. No.: 11/638,272

(22) Filed: Dec. 12, 2006

(65) Prior Publication Data

US 2007/0293207 A1 Dec. 20, 2007

Related U.S. Application Data

(60) Provisional application No. 60/818,539, filed on Jul. 6, 2006, provisional application No. 60/762,901, filed on Jan. 30, 2006, provisional application No. 60/765,198, filed on Feb. 6, 2006, provisional application No. 60/777,244, filed on Feb. 28, 2006, provisional application No. 60/866,114, filed on Nov. 16, 2006.

(51) Int. Cl.
*H04B 15/00* (2006.01)
*H04L 29/08* (2006.01)
*H04M 3/42* (2006.01)

(52) U.S. Cl.
CPC ............ *H04L 67/24* (2013.01); *H04L 67/325* (2013.01); *H04M 3/42365* (2013.01); *H04L 67/02* (2013.01); *H04L 67/04* (2013.01); *H04L 67/306* (2013.01); *H04M 3/42093* (2013.01)

(58) Field of Classification Search
CPC ........................................................ H04L 67/02
USPC ........................... 455/62, 415, 550; 709/203
See application file for complete search history.

(56) References Cited

U.S. PATENT DOCUMENTS 5,875,240 A 2/1999 Silverman
5,894,512 A 4/1999 Zenner
(Continued)

FOREIGN PATENT DOCUMENTS

CN 1581901 A 2/2005
DE 10341737 A1 4/2005
(Continued)

OTHER PUBLICATIONS

Griffin et al., "Integrating SIP, presence and FTP to provide wireless multimedia messaging", *Wireless Communications and networking conference, IEEE Communications Society*, 4:2581-2586 (2004).
(Continued)

*Primary Examiner* — Hsin-Chun Liao
(74) *Attorney, Agent, or Firm* — Muncy, Geissler, Olds & Lowe, P.C.

(57) ABSTRACT

Systems and methods are presented for enabling improved communication between one or more communication devices such as mobile wireless devices. The present disclosure provides updatable dynamic, or active, phone book capabilities that provide a user with both contact information as well as dynamic network (web) content that can be updated by communication between a mobile device and a server. The disclosure further provides methods and systems for presence-based message delivery based on a criteria such as presence or identity of a caller or caller's device.

25 Claims, 9 Drawing Sheets

(56) References Cited

U.S. PATENT DOCUMENTS

| | | | |
|---|---|---|---|
| 6,073,016 A | 6/2000 | Hulthen et al. | |
| 6,154,465 A | 11/2000 | Pickett | |
| 6,185,184 B1* | 2/2001 | Mattaway et al. | 370/230 |
| 6,188,762 B1 | 2/2001 | Shooster | |
| 6,233,234 B1 | 5/2001 | Curry et al. | |
| 6,253,075 B1* | 6/2001 | Beghtol et al. | 455/415 |
| 6,311,073 B1 | 10/2001 | Charpentier et al. | |
| 6,324,263 B1 | 11/2001 | Sherwood et al. | |
| 6,333,931 B1 | 12/2001 | LaPier et al. | |
| 6,496,501 B1 | 12/2002 | Rochkind et al. | |
| 6,564,261 B1 | 5/2003 | Gudjonsson et al. | 709/227 |
| 6,683,870 B1 | 1/2004 | Archer | |
| 6,697,858 B1 | 2/2004 | Ezerzer et al. | |
| 6,731,630 B1 | 5/2004 | Schuster et al. | |
| 6,757,531 B1 | 6/2004 | Haaramo et al. | |
| 6,807,558 B1* | 10/2004 | Hassett et al. | 709/203 |
| 6,829,349 B1 | 12/2004 | Neale et al. | |
| 6,928,294 B2 | 8/2005 | Maggenti et al. | |
| 6,950,504 B1 | 9/2005 | Marx et al. | |
| 6,985,569 B2 | 1/2006 | Baker | |
| 7,173,910 B2 | 2/2007 | Goodman | |
| 7,190,962 B2 | 3/2007 | Brehler et al. | |
| 7,239,629 B1 | 7/2007 | Olshansky et al. | |
| 7,274,776 B1 | 9/2007 | Virzi et al. | |
| 7,274,786 B2 | 9/2007 | Fleischer, III et al. | |
| 7,301,934 B1 | 11/2007 | Casati et al. | |
| 7,317,716 B1 | 1/2008 | Boni et al. | |
| 7,324,505 B2 | 1/2008 | Hoover | |
| 7,336,772 B1 | 2/2008 | Velusamy | |
| 7,400,881 B2 | 7/2008 | Kallio | |
| 7,450,563 B2 | 11/2008 | Cook et al. | |
| 7,472,776 B2 | 1/2009 | Charmat | |
| 7,480,733 B2 | 1/2009 | Cernohous et al. | |
| 7,502,339 B1 | 3/2009 | Pirkola et al. | |
| 7,620,404 B2 | 11/2009 | Chesnais et al. | |
| 7,907,708 B2 | 3/2011 | Walker et al. | |
| 8,082,346 B2 | 12/2011 | Ito | |
| 8,290,127 B2 | 10/2012 | Reynolds et al. | |
| 9,294,514 B2 | 3/2016 | Guedalia et al. | |
| 2001/0038624 A1 | 11/2001 | Greenberg et al. | |
| 2002/0019246 A1 | 2/2002 | Forte | |
| 2002/0068599 A1* | 6/2002 | Rodriguez et al. | 455/550 |
| 2002/0075850 A1 | 6/2002 | Cruz et al. | |
| 2002/0099670 A1 | 7/2002 | Jakobsson | |
| 2002/0124100 A1 | 9/2002 | Adams | |
| 2002/0129103 A1 | 9/2002 | Birkler et al. | |
| 2002/0132611 A1 | 9/2002 | Immonen et al. | |
| 2002/0136206 A1 | 9/2002 | Gallant et al. | |
| 2002/0169984 A1 | 11/2002 | Kumar et al. | |
| 2002/0176374 A1 | 11/2002 | Lee et al. | |
| 2002/0197991 A1 | 12/2002 | Anvekar et al. | |
| 2003/0028601 A1 | 2/2003 | Rowe | |
| 2003/0091024 A1 | 5/2003 | Stumer | |
| 2003/0115138 A1 | 6/2003 | Brown et al. | |
| 2003/0118175 A1 | 6/2003 | Hariri et al. | |
| 2003/0167223 A1 | 9/2003 | Pledereder et al. | |
| 2003/0185359 A1 | 10/2003 | Moore et al. | |
| 2003/0194078 A1 | 10/2003 | Wood et al. | |
| 2004/0044771 A1 | 3/2004 | Allred et al. | |
| 2004/0047339 A1 | 3/2004 | Wang et al. | |
| 2004/0076139 A1 | 4/2004 | Kang-Yeh et al. | |
| 2004/0157629 A1 | 8/2004 | Kallio et al. | |
| 2004/0165712 A1 | 8/2004 | Boyle et al. | |
| 2004/0165714 A1 | 8/2004 | Pinault | |
| 2004/0179669 A1 | 9/2004 | Gilbert et al. | |
| 2004/0193601 A1 | 9/2004 | Hu et al. | |
| 2004/0202117 A1 | 10/2004 | Wilson | |
| 2004/0202187 A1 | 10/2004 | Kelly et al. | |
| 2004/0203643 A1 | 10/2004 | Bhogal et al. | |
| 2004/0213209 A1 | 10/2004 | O'Connor et al. | |
| 2005/0025043 A1 | 2/2005 | Mussman et al. | |
| 2005/0027716 A1 | 2/2005 | Apfel | |
| 2005/0027867 A1 | 2/2005 | Mueller et al. | |
| 2005/0036597 A1 | 2/2005 | Kobrosly et al. | |
| 2005/0059418 A1 | 3/2005 | Northcutt | |
| 2005/0070230 A1 | 3/2005 | Das et al. | |
| 2005/0083940 A1 | 4/2005 | Eales et al. | |
| 2005/0088999 A1 | 4/2005 | Waylett et al. | |
| 2005/0163065 A1 | 7/2005 | Yule | |
| 2005/0186960 A1 | 8/2005 | Jiang | |
| 2005/0243809 A1 | 11/2005 | Best et al. | |
| 2005/0273512 A1 | 12/2005 | Cho | |
| 2005/0289180 A1 | 12/2005 | Pabla et al. | |
| 2006/0092917 A1 | 5/2006 | Kucmerowski et al. | |
| 2006/0114883 A1 | 6/2006 | Mehta et al. | |
| 2006/0167991 A1 | 7/2006 | Heikes et al. | |
| 2006/0168326 A1 | 7/2006 | Baldwin et al. | |
| 2006/0222156 A1 | 10/2006 | Smith et al. | |
| 2006/0236388 A1 | 10/2006 | Ying et al. | |
| 2006/0246877 A1 | 11/2006 | Kashanian et al. | |
| 2006/0258330 A1 | 11/2006 | Guedalia et al. | |
| 2007/0005776 A1 | 1/2007 | Hansen et al. | |
| 2007/0071006 A1 | 3/2007 | Bosch et al. | |
| 2007/0112964 A1 | 5/2007 | Guedalia et al. | |
| 2007/0121816 A1 | 5/2007 | Bauchot et al. | |
| 2007/0143397 A1 | 6/2007 | Guedalia et al. | |
| 2007/0162350 A1 | 7/2007 | Friedman | |
| 2007/0281676 A1 | 12/2007 | Borras et al. | |
| 2007/0287430 A1 | 12/2007 | Hosain et al. | |
| 2008/0013531 A1 | 1/2008 | Elliott et al. | |
| 2008/0076409 A1 | 3/2008 | Hinrikus et al. | |
| 2008/0096592 A1 | 4/2008 | Waytena et al. | |
| 2008/0139210 A1 | 6/2008 | Gisby et al. | |
| 2008/0159515 A1 | 7/2008 | Rines | |
| 2008/0222127 A1 | 9/2008 | Bergin | |
| 2008/0263170 A1 | 10/2008 | Caron et al. | |
| 2013/0121215 A1 | 5/2013 | Guedalia et al. | |
| 2013/0281057 A1 | 10/2013 | Bender et al. | |
| 2014/0323103 A1 | 10/2014 | Guedalia et al. | |
| 2016/0165057 A1 | 6/2016 | Guedalia et al. | |

FOREIGN PATENT DOCUMENTS

| | | |
|---|---|---|
| EP | 1179941 A2 | 2/2002 |
| EP | 1517256 A2 | 3/2005 |
| EP | 1701569 A1 | 9/2006 |
| GB | 2 391 135 A | 1/2004 |
| KR | 20020018238 A | 3/2002 |
| WO | 9723083 | 6/1997 |
| WO | WO 98/47298 A3 | 10/1998 |
| WO | 9934628 A1 | 7/1999 |
| WO | 0198867 A2 | 12/2001 |
| WO | 0215030 A1 | 2/2002 |
| WO | 0221779 A1 | 3/2002 |
| WO | 0239237 A | 5/2002 |
| WO | 03032613 | 4/2003 |
| WO | WO 03/094011 A1 | 11/2003 |
| WO | 2005065296 A | 7/2005 |
| WO | 2006039552 A2 | 4/2006 |
| WO | WO2006044654 A2 | 4/2006 |
| WO | 2007001850 A1 | 1/2007 |
| WO | 2007005124 A2 | 1/2007 |
| WO | 2007025373 A | 8/2007 |
| WO | 2007109559 A2 | 9/2007 |
| WO | 2008013642 A2 | 1/2008 |

OTHER PUBLICATIONS

Handley et al., "RFC 2543 SIP: Session Initiation Protocol", *IETF Standard, Internet Engineering Task Force*, pp. 1-153 (1999).

MMusic WG Handley/Schulzrinne/Schooler ISI/Columbia U./Caltech, "SIP: session initiation protocol", *IETF Standard-Working-Draft, Internet Engineering Task Force*, vol. 4, pp. 1-83 (1997).

Saravanan Shanmugham Cisco Systems Inc., Daniel C. Burnett, Media Resource Control Protocol Version 2(MRCPv2), *IETF Standard-Working-Draft*, Internet Engineering Task Force, IETF, vol. Speechsc, No. 6, pp. 1-176 (2005).

International Search Report for PCT/US2006/019135, mailed Jan. 16, 2007.

Kunkundan Narendra Singh, Thesis, "Reliable, Sealable and Interoperable Internet Telephony", Columbia University, 2006; http://www1.cs.columbia.edu/~kns10/publication/thesis.pdf.

(56) References Cited

OTHER PUBLICATIONS

Case Study, Intel Centrino, Mobile Technology, Intel Xeon Processor MP, Shanghai GM, "Seamless Communications", http://www.intel.com/netcomms/technologies/voice/310998.pdf.
Janne Lundqvist et al., Messaging-over-IP—A network for messaging and information services; http://www.ericsson.com/ericsson/corpinfo/publications/review/1999_03/files/1999035.pdf.
NST, New Standard Telephony, Convergence Simplified, Company Profile, NST 2005; http://www.ns-tel.com/files/NST_Company_Profile.pdf.
Alcatel-Lucent, "Alcatel-Lucent OmniPCX Enterprise Communication Server: Delivering powerful, reliable and scalable IP communications to drive your 21st century business", 2007. http://www1.alcatel-lucent.com/com/en/appcontent/opgss/ENT_OmniPCX%20Enterprise_datasheet_1007_EN_tcm228-1353221635.pdf.
Colman Ho, "Voice Over Internet Protocol (VoIP) Overview", Presentation to TSACC, Mar. 23, 2004; www.isacc.ca/isacc/_doc/Book%2017%20-%202004/TSACC-04-31305.ppt.
Intel Communications Alliance, "TeleSym and Intel Deliver Voice-over-internet-Protocol (VoIP) Enterprise Communication Solution", Jun. 2004, http://www.intel.com/network/csp/pdf/9003wp.pdf.
International Search Report and Written Opinion—PCT/US2007/087268, International Searching Authority—European Patent Office, Aug. 1, 2008.
Petrie, Pingtel Corp., "A Framework for SIP User Agent Profile Delivery", draft-ietf-sipping-config-framework-02.txt, IETF Standard-Working-Draft, Internet Engineering Task Force, No. 2, pp. 1-22, 2004.
Rosenberg, J., et al., "SIP: Session initiation protocol" Jun. 1, 2002, pp. 1-269, XP015009039.
Schulzrinne, H., et al.: "Dynamic Host Configuration Protocol (DHCPv6) Options for Session Initiation Protocol (SIP) Servers" RFC 3319, IETF Standard, Internet Engineering Task Force, IETF, CH. Jul. 1, 2003, XP015009189; ISSN: 0000-0003.
Sinnreich, et al., "SIP Telephony Device Requirements and Configuration", draft-sinnreich-sipdev-req-07.txt, IETF Standard-Working-Draft, Internet Engineering Task Force, No. 7, pp. 1-37, 2005.
Sinnreich, H./pulver.com, et al., "SIP Telephony Device Requirements and Configuration" Internet Draft, Oct. 2005, tools.ietf.org/id/draft-sinnreich-sipdev-req-08.txt, IETF Standard-Working-Draft, Internet Engineering Task Force, IETC, CH, No. 8, Oct. 1, 2005, XP015043067, ISSN: 0000-0004.
SIP Connect, "CableLabs Proposal for SIP Connect 1.1", 2007, http://www.sipforum.org/component/option.com_docman/task.doc_view/gid.149/Itemid.75/.
Wikipedia, "GPRS Core Network" [Online], Jul. 12, 2004 [Retrieved on Sep. 18, 2015], www.wikipedia.org, Retrieved from: https://web.archive.org/web/20040813011426/http://en.wikipedia.org/wiki/GPRS_core_network.

* cited by examiner

SYSTEM AND METHOD FOR DYNAMIC PHONE BOOK AND NETWORK CONTENT LINKS IN A MOBILE DEVICE

RELATED APPLICATIONS

The present application claims priority under 35 U.S.C. §120 to U.S. provisional patent applications by the present inventors: Ser. Nos. 60/818,539, filed on Jul. 6, 2006; 60/762,901, filed on Jan. 30, 2006; 60/765,198, filed on Feb. 6, 2006; 60/777,244, filed on Feb. 28, 2006; and 60/866,114, filed on Nov. 16, 2006, all of which are hereby incorporated by reference in their entirety.

TECHNICAL FIELD

The present disclosure and inventions generally relate to communications with a (wireless) mobile communication device such as a cellular phone, personal digital assistant, or smart phone. More specifically, the present disclosure describes novel systems and methods for delivering dynamic information to a mobile device and for sending information from the mobile device.

BACKGROUND

Mobile communication devices provide real-time capabilities for communicating with others. This includes communications by voice (whether digital or analog) as well as data communications. Some forms of communication available to a mobile device provide messaging so that, e.g., text messages can be exchanged between the user of the mobile device and others.

A typical mobile device, for example a smart phone, is essentially a hardware device which includes communications hardware for receiving and sending signals to a wireless carrier station, in addition to a processor in the mobile device on which software instructions can execute to accomplish the various functions of the phone. Mobile devices can be equipped with a basic operating system on which applications and utility programs can run to determine the features provided by the mobile device.

One common utility application that is provided on mobile devices is the ubiquitous "phone book" or "address book" utility application. This allows storing the names and phone numbers for a set of "contacts" that the mobile device user can call by selecting an individual contact from the set of contacts. Contacts may be called up on the device once they are stored by a user interface such as a cursor, or by speaking a sound (name) into a microphone on the device, etc. A user's contact information is usually stored on the device and/on a server in a contacts file, list, or database, and can be updated and edited by an authorized user.

Another application that runs on equipped mobile devices is a browser application. This is typically a compact program allowing the user to "browse" information available through the carrier's network, including some World Wide Web ("web") sites that support mobile systems. A user can either select a site to view by typing a link into a user interface of the browser application, or move to a linked site on the web using the device's browser application. Such sites can provide dynamic information to interested subscribers, usually with payment of a fee to the carrier for the browsing function and service or with subscription to a site that provides the information to its subscribers. Users can "bookmark" a link so that they can return to that site easily by selecting from a list of bookmarks rather than follow a more cumbersome navigation or typing process to return to the site. Bookmarks are commonly stored on the device in a bookmark list, database, or file.

Phone book and browser information can be better stored, maintained, processed, and displayed as discussed below. Furthermore, better messaging and communication systems and techniques can be achieved using the concepts described herein to enhance the connectivity and usability of a mobile device and the services available to its user and others.

SUMMARY

While present systems provide phone book and bookmarked links to sites for mobile users as discussed above, the way in which present systems store, process, maintain, and present or display this phone book and browser information to their users is limited and imperfect.

For example, the present disclosure provides systems and methods for integrating dynamic contact and bookmarked link information in a unified way that can be easier and more informative for the users of mobile devices. In some embodiments, one or more links or bookmarks to a dynamic information site or source is incorporated into a phone book utility running on a mobile device. The link or bookmark can then be seen, optionally with some status or information about the link, and optionally with the capability to activate or select the link from within the phone book utility. In related embodiments, the dynamic link may contain information that can be variable and updatable over time. This dynamic link information may be published to the mobile device, pushed to the dynamic or active phone book utility so that the user can see and respond to the information. This can also be accomplished at the same time or in connection with updating a dynamic or active phone book listing of contacts who are "active" or on-line or in another state.

In some aspects, the dynamic phone book data is maintained on a server that associates specific active or dynamic information with a particular one or more mobile devices and/or users thereof. The dynamic information may provide "presence" information to the mobile devices indicative of a state of connectedness of each of the contacts in a subscriber's contacts list. The presence information may be more than just "connected" or "not connected," but may also include various states (e.g., "in a meeting," "in flight") or may be a custom status message that is determined by a specific contact responding to a specific other contact (e.g., "Tim, leave me alone.")

In some aspects, while present systems provide call handling features on mobile devices, these features are incomplete, and are not always convenient or ideal for handling calls from different types of callers as they arrive at a mobile device and/or server. Therefore, the present disclosure provides improved systems and methods for receiving, handling, screening, and filtering incoming calls and messages.

In other aspects, the present systems and methods allow for filtering an incoming call or message so that the receiving mobile device responds differently to the incoming call or message. In some instances, the present features include those promoted by the present Applicant under the names "iSkoot Mobile Service" and "Personal Reach." In addition to providing customizable alert (audible ring, vibration, illumination) features, the present disclosure covers response features that allow the user of a mobile communication device (or "mobile device") to set the device to automatically or manually respond differently to different incoming calls. Specifically, incoming calls may be screened by type or identity of caller or another criterion to respond with a message to the caller that varies depending on the type or identity of the caller or the other criterion.

Still other aspects disclosed herein are directed to the polling and updating of information exchanged between a server and a client device over a communication link. Specifically, various embodiments of the present inventions include a system and methods for controlling and setting the way in which the mobile device receives updated active phone book information. This includes the periodicity and triggering methods for initiating and responding to update requests by the client and/or server.

Specifically, the present disclosure includes embodiments directed to a communication system providing communication between a client and a server, the system comprising a client mobile device having hardware and software to exchange information with other devices over a network; the client mobile communication device including a storage medium that stores data and program instructions and further stores a representation of dynamic phone book data including contact information and network content information; the client mobile communication device further comprising a processor that executes the stored program instructions with said stored data; the client mobile communication device further comprising an interface that simultaneously displays a representation of said dynamic phone book data including said contact information and said network content information in a same application window; wherein said application window is responsive to an application that maintains said dynamic phone book data substantially updated with a corresponding state of said dynamic phone book data obtained by the client mobile communication device from said other devices over said network.

Other embodiments further comprise a server coupled to said client, said server including a processor that executes program instructions to communicate with said client and cause selected information corresponding to said dynamic phone book data to be delivered from the server to the client. Other embodiments further comprise a user interface for selectively determining at said client which of a plurality of other devices are blocked from activating an alert signal on said client. In other embodiments, said alert signal includes any of: an audible alert signal, a vibrating alert signal, and a visual alert signal. Yet other embodiments are directed to a database with data stored on said storage medium, wherein said dynamic phone book data include both updatable contact data and updatable network content data. In yet other embodiments, said network content data comprise updateable network content link information representing a state of information corresponding to a link to said information. In still other embodiments, said program instructions comprise instructions for setting a user-selectable response message delivered to a caller on the basis of the caller's identity. In still other embodiments, said program instructions comprise instructions for setting a user-selectable response message delivered to a caller on the basis of whether said caller was associated with an entry in the user's stored contacts information.

The present disclosure is further directed to a method for communicating with a mobile communication device over a network, comprising storing dynamic phone book data on the mobile communication device, said dynamic phone book containing information including contact information and network content information, both of said contact information and said network content information including active content that can change from time to time; receiving an incoming communication request from a caller using another communication device over the network; comparing an identity of either said caller or said other communication device to an entry in said dynamic phone book; and causing a response message to be sent to said caller using said other communication device to be sent to said other communication device, said response message being specifically adapted for said caller prior to receiving said incoming communication request.

Other embodiments of the above method further comprise filtering said incoming communication request on the basis of its origin so that it can alternately cause an alert signal on said mobile communication device or be forwarded to a messaging mailbox and not cause an alert signal on said mobile communication device.

Still other embodiments of the present disclosure are directed to a method for maintaining a dynamic phone book database, containing both dynamic contact information and dynamic network content information, comprising determining a periodicity for checking for updated data corresponding to entries in said dynamic phone book database; at intervals substantially determined by said periodicity, sending a signal from said mobile communication device to a source of updated information indicative of a request to receive updated phone book information from said source of updated information; receiving updated dynamic phone book data comprising dynamic contact information and dynamic network content information from said source of said updated information; storing said updated dynamic phone book data in a database on said mobile communication device; and presenting a representation of said updated dynamic phone book data on a display on said mobile communication device such that a user of said mobile communication device can choose to select an entry from said dynamic phone book for the purpose of delivering a communication to a contact from said dynamic phone book or activate a link to said dynamic network content.

Other embodiments of the above method disclosed herein are directed to determining said periodicity comprises using a predetermined subscription status of a user to determine said periodicity. Still other methods disclosed herein are directed to the above method, wherein determining said periodicity comprises using a user-selectable power saving setting to determine said periodicity. Yet other embodiments include further selecting one of said dynamic contacts information or dynamic network content information to establish a connection to a destination corresponding to said dynamic contacts information or dynamic network content information. Still other embodiments include further setting an outgoing message to be sent by said mobile communication device to a caller specifically in response to an identity of said caller or said caller's communication device. And other embodiments yet are directed to setting a user-specific response message to be sent to a subset of persons associated with said dynamic contacts information upon arrival of an incoming communication from said subset of persons or their communication devices.

DESCRIPTION

As discussed briefly, the present disclosure provides new and useful systems and methods for providing voice and data communication to and from a wireless mobile device and/or user. The terms "dynamic" and "active" are generally interchangeable for the purposes of the present disclosure and imply information that may change from time to time.

Figure 1:
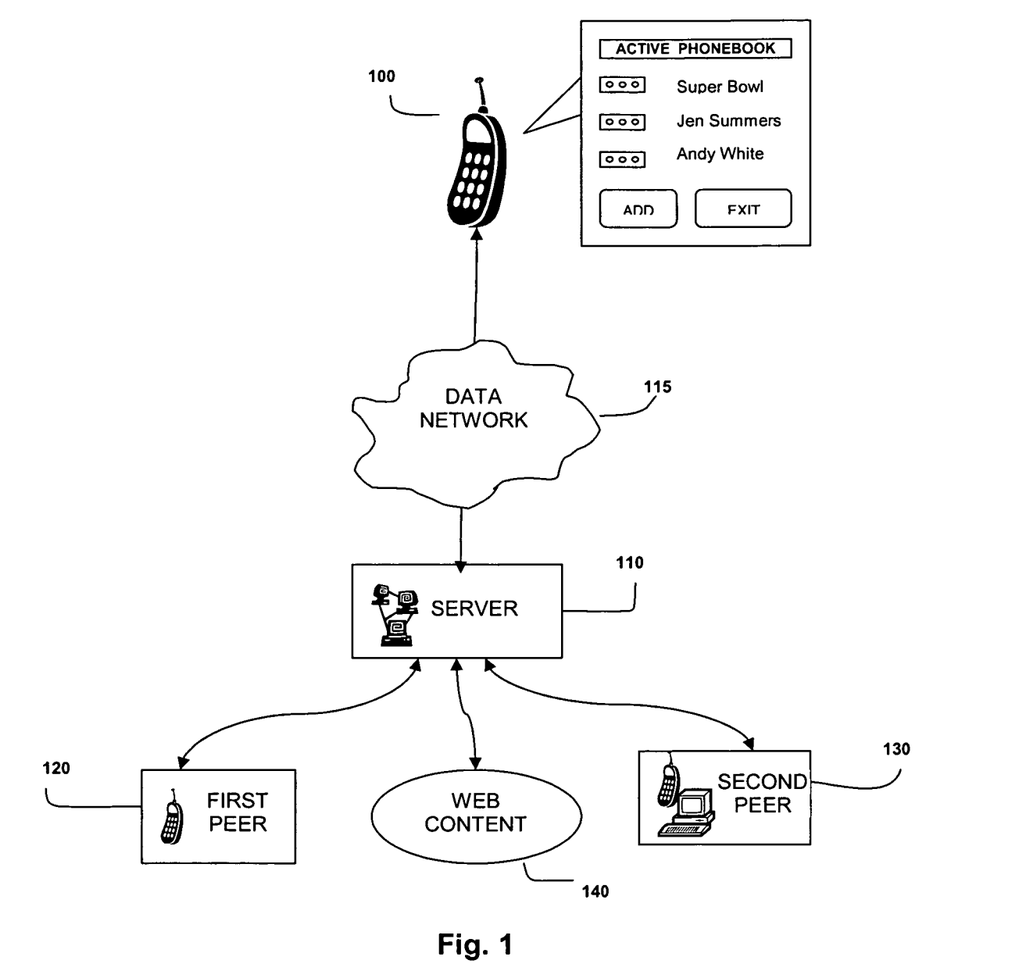
FIG. 1 illustrates components of an exemplary system within which one or more aspects of the invention may be practiced.

FIG. 1 illustrates the major components of an exemplary system within which one or more aspects of the invention may be practiced. The components shown include a mobile device 100 which contains a processor circuit that can execute stored software instructions. The software instructions correspond to, inter alia, software that provides an "active phone book" that presents dynamic (active) information within a phone book utility context. As shown, the active phone book illustrates several types of information to a user of mobile device 100. For example, the information presented to the user within the active phone book context includes an active link to something, such as a source for information concerning an event such as a sports event ("Super Bowl"). Events and links to information or sites on a network from which the user can benefit include a wide variety of information such as news, weather, sports, medical, stock quotes, and other types of information that are variable and require updating periodically to keep the information current or near-current. Other entries in the active phone book include contacts ("Jen Summers," "Andy White"). The figure is intended to cover active phone book presentations to the user where the user can discern some connection or status information about the contact or about the book marked link. For example, one of a pre-determined connection states (e.g., "Online" "Offline" and "Busy"). But further, as will be discussed in more detail below, other connectivity status messages could be displayed to the user of mobile device 100, including custom and dynamic indications of connection status.

The mobile device 100 is coupled to a data network 115 by way of a wireless (cellular, etc.) connection as known to those skilled in the art of wireless communications. The data network 115 may include several networks and cover private and public networks, including the Internet and local area networks (LANs). A carrier that provides the coupling between the mobile device 100 and the data network 115 may employ a firewall and various infrastructure systems and servers to complete this coupling and secure the communications over the coupling.

Server 110 is coupled to the data network 115 by wireless or wired coupling means as appropriate and may be logically distributed depending on the desired architecture. Server 110 may be protected and secured by one or more firewalls as known to those skilled in the art of computer security.

Server 110 is further coupled to content and "peer" devices. A "peer" in the present context can be of a variety of types, including a wireless device, a personal computer (PC), or other device enabled and constructed to communicate with the server. For example, a first peer 120 is coupled to server 110 and communicates therewith, optionally through intermediate computers and communication links as necessary. Also, a second peer 130 is similarly coupled to server 110.

Web content 140 is provided by ways known to those skilled in the art of the Internet and associated client-server web technologies. The web content 140 can include a large variety of information, some of which is dynamic or active and changes in time. Dynamic or active web content can include the types of information published to the web by a server, for example to distribute news, weather, sports, medical, stock quotes, and other data. Web content 140 may be served by dedicated servers and/or other computers coupled to a source of dynamic data one the one hand and to the data network 115 on the other hand. Certain information may be selected for dynamically forwarding from server 110 to client mobile device 100 as discussed in more detail below.

Figure 2:
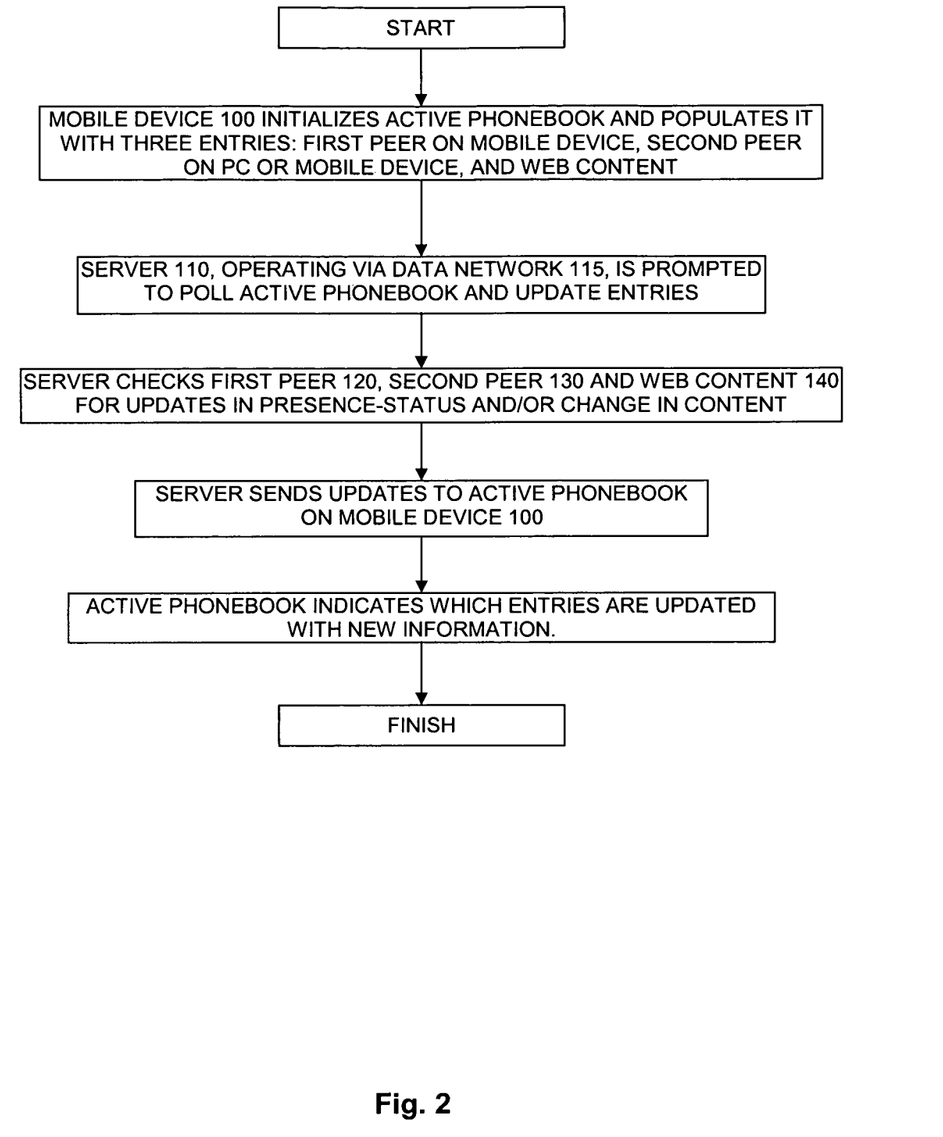
FIG. 2 an exemplary method for using the system of FIG. 1 to update an active phone book on a client mobile device.

FIG. 2 illustrates an exemplary method for using the system of FIG. 1 to update an active phone book on a client mobile device. According to this embodiment, mobile device 100 initializes an active phone book. The active phone book is "populated" with data entries including a first entry corresponding to first peer 120 on another mobile device, a second entry corresponding to second peer 130 using a PC or a mobile device, and a third entry corresponding to dynamic web content 140.

According to the method of FIG. 2, server 110 "polls" the mobile device 100 and update the active phone book thereon. Polling may be accomplished through a number of techniques known to those skilled in the art. For example, similar embodiments would be possible, for example by "pushing" dynamic content to the client mobile device 100 from server 110. Also, it is possible to have mobile device 100 "ping" server 110 periodically or upon some condition to cause the server 110 to deliver updated information to the client 100. Furthermore, server 110 can "wake up" the client through a signal sent to the client 100 that prepares the client to accept and receive update information from server 110. In the present context, the client may send an initiation signal to the server, the server may send an initiation signal to the client, or another mechanism may be used to accomplish the desired result.

Server 110 being coupled to the peer devices can check the devices for updates that need to be communicated to mobile device 100. This also includes checking the source of dynamic web content 140 for changes or updates to its content that is to be delivered to mobile device 100.

Once server 110 is in possession of updated or new information or content from the peer devices 120, 130 and/or web content 140, server 110 sends updates to the mobile device 100 active phone book program. The means for delivering the updated data to mobile device 100 depends on the architecture in use, but can include HTTP communication and others.

The mobile device 100, once in receipt of updated dynamic or active content for its phone book contacts and/or dynamic content information may update the information in the appropriate phone book or contacts or bookmark files or databases affected. This updated information is displayed or indicated to the user of mobile device 100. For example, if a contact has come online after a period of inactivity, the active phone book will display an indication that this contact is now online and available for communication. For bookmarks, the active phone book can indicate that the bookmark's status has changed, or a value within the information corresponding to a link has been updated. Sometimes this is done by simply updating the value of a variable being shown to the user (e.g., the value of a stock that is linked within the active phone book application). In some embodiments, the updating is indicated, e.g. visually or audibly, so that the user of the device understands that the dynamic phone book information has been updated. This may for example be accomplished by using an appropriate graphical icon, such as a checkmark or a color to indicate that the data is up to date.

Figure 3:
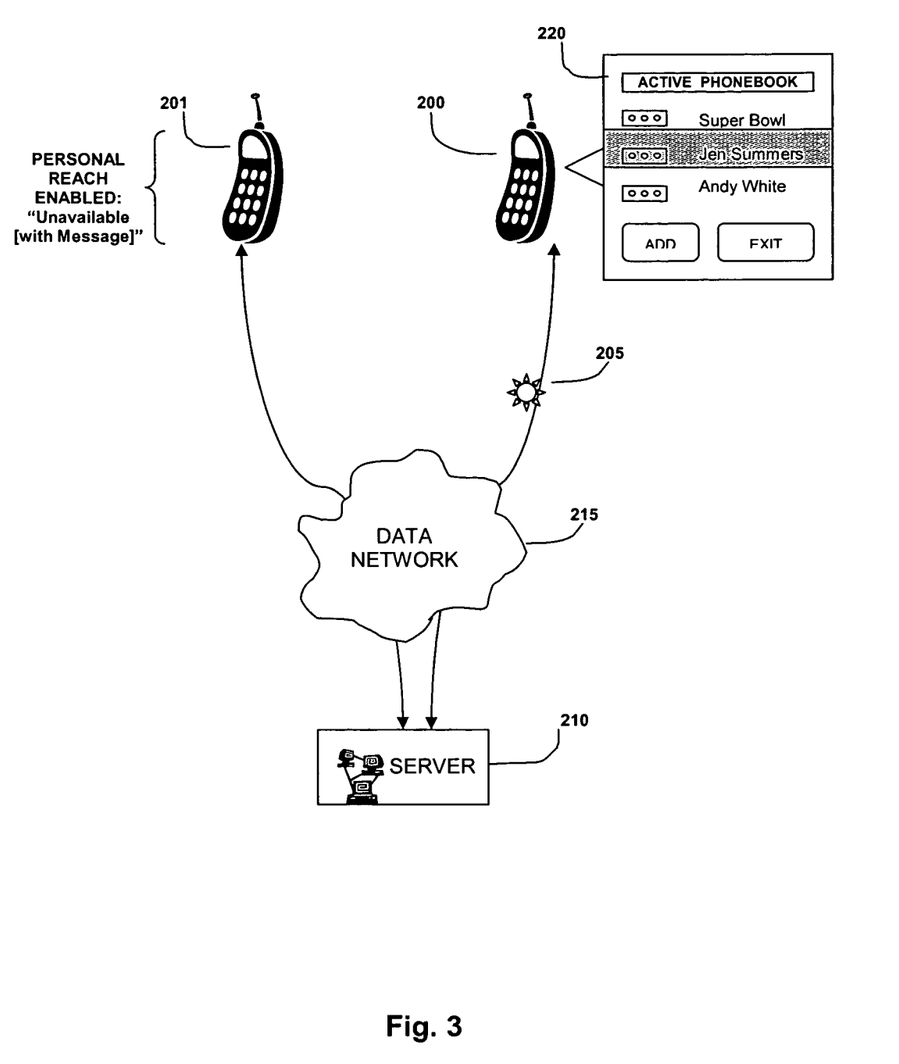
FIG. 3 illustrates another exemplary architecture for a system on which an active phone book according to the present disclosure is implemented.

FIG. 3 illustrates an exemplary architecture for a system on which an active phone book according to the present disclosure is implemented. A first user and/or first user's mobile device 200 include software instructions stored on and executed in hardware on mobile device 200. The software instructions include instructions for executing an active phone book application or utility program on mobile device 200. The box 220 is intended to depict a graphical user interface representation of information presented to the first user of device 200. This information corresponding to the first user's active phone book includes entries concerning first user's contacts "Jen Summers" and "Andy White". Also, the first user's active phone book includes an entry representing a "Super Bowl" event that can receive dynamic updates from server 210 as described earlier.

In this example, Jen Summers and/or her device 201 includes software running on mobile device 201 set to enable selectable messaging and message responses to other users. Accordingly, first user device 200 displays in its active phone book 220 an indication of the selectable messaging status of Jen Summers. The selectable messaging information 205 is delivered over the data network 215 with the aid of software running on server 210 such that selected message responses 205 set by Jen Summers's mobile device 201 are automatically sent to her contacts and displayed on her contacts' active phone book interface 220. In one embodiment, Jen Summers' device 201 causes a broadcast of updated status information concerning Jen Summers' device 201 to all or a selected portion of her contacts (e.g., first user 200). In another embodiment, Jen Summers' device may be polled by server 210, and in response to a server poll responds with updated information that the server 210 forwards to Jen Summers' contacts (e.g., first user 200). In yet another embodiment, first user mobile device 200 requests updates to all contacts and links within first user's active phone book 220, and in response to the request from first user 200 the server 210 responds to first user mobile device 200 with an updated set of information to update active phone book 220 on first mobile device 200. From the perspective of the user, the active phone book information appears to be "refreshed" upon receipt of updated active phone book information from server 210.

Figure 4:
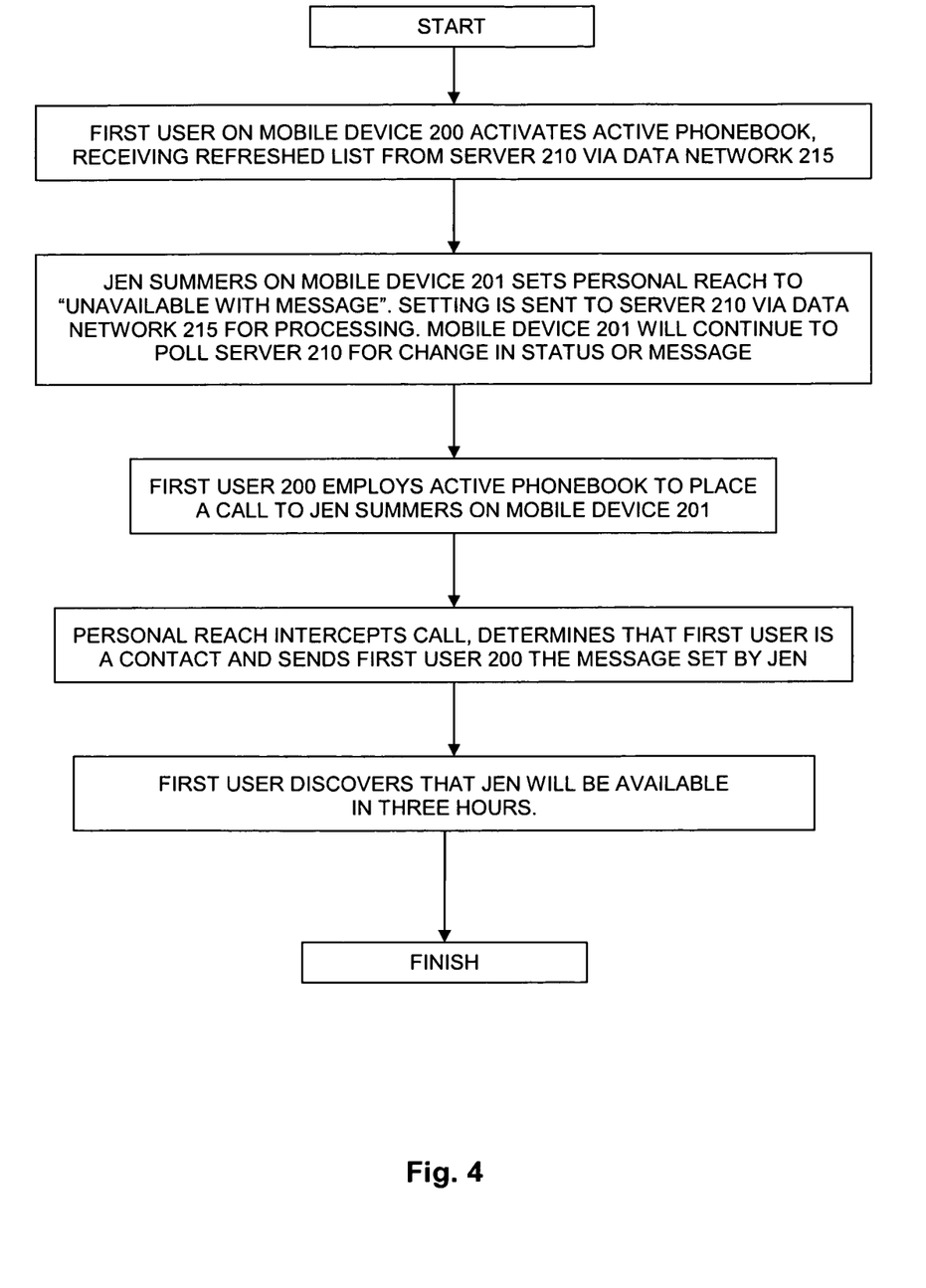
FIG. 4 illustrates another exemplary method for providing one user information concerning another user by way of the active phone book.

FIG. 4 illustrates an exemplary method for providing one user with information concerning another user by way of the active phone book. First user and/or first user's mobile device 200 activates the active phone book application on the first mobile device 200, for example automatically on startup of mobile device 200 or as a result of a condition met or as a result of an explicit command entered by the first mobile device user through some hardware and/or software interface to the first mobile device 200. As part of the operation of first mobile device's active phone book, an updated (refreshed) set of information is received at the first mobile device 200 from server 210 via data network 215 as discussed earlier.

A second user ("Jen Summers") using mobile device 201 sets her mobile device so that a response message (e.g., "Unavailable [with message]") is sent to those attempting to make contact with Jen Summers. This response message is communicated over data network 215 to server 210 for processing. Polling between the mobile device 201 and server 210 continues and changes in status or message from Jen Summers' mobile device 201 are kept current.

The first user then attempts a call or message from his or her (first) mobile device 200 to Jen Summers' device 201. Since server 210 typically processes communications between the respective mobile devices 200, 201, software implemented on second mobile device 201 and/or server 210 receives (intercepts) the communication attempt from first device 200. The software determines the identity of the first user and/or first mobile device 200 and confirms that the first user is one of the contacts in Jen Summers' contacts group. The software running on the server 210 and/or Jen Summers' mobile device 201 then sends first mobile device 200 the response message as set by Jen Summers on her mobile device 201. The response message can be ("Unavailable—Back In Three Hours"), where the portion "Back In Three Hours" is a message that can be typed on a user interface of second mobile device 201 or an audio or graphical message. The response itself may be stored on the second mobile device 201 or may be stored on the server 210 to minimize the processing, storage, power, and resource load on mobile device 201.

Jen Summers' response message ("Unavailable—Back In Three Hours") is then forwarded to the originator of the call or message, the first mobile device 200, and is seen or heard or otherwise indicated so that a user of first mobile device 200 understands some meaningful information that is dynamically in context regarding the connectivity state of Jen Summers. Such dynamic messaging can be more useful than just receiving a busy signal, an "Online"/"Offline" message, etc. from the intended recipient of a communication.

Figure 5:
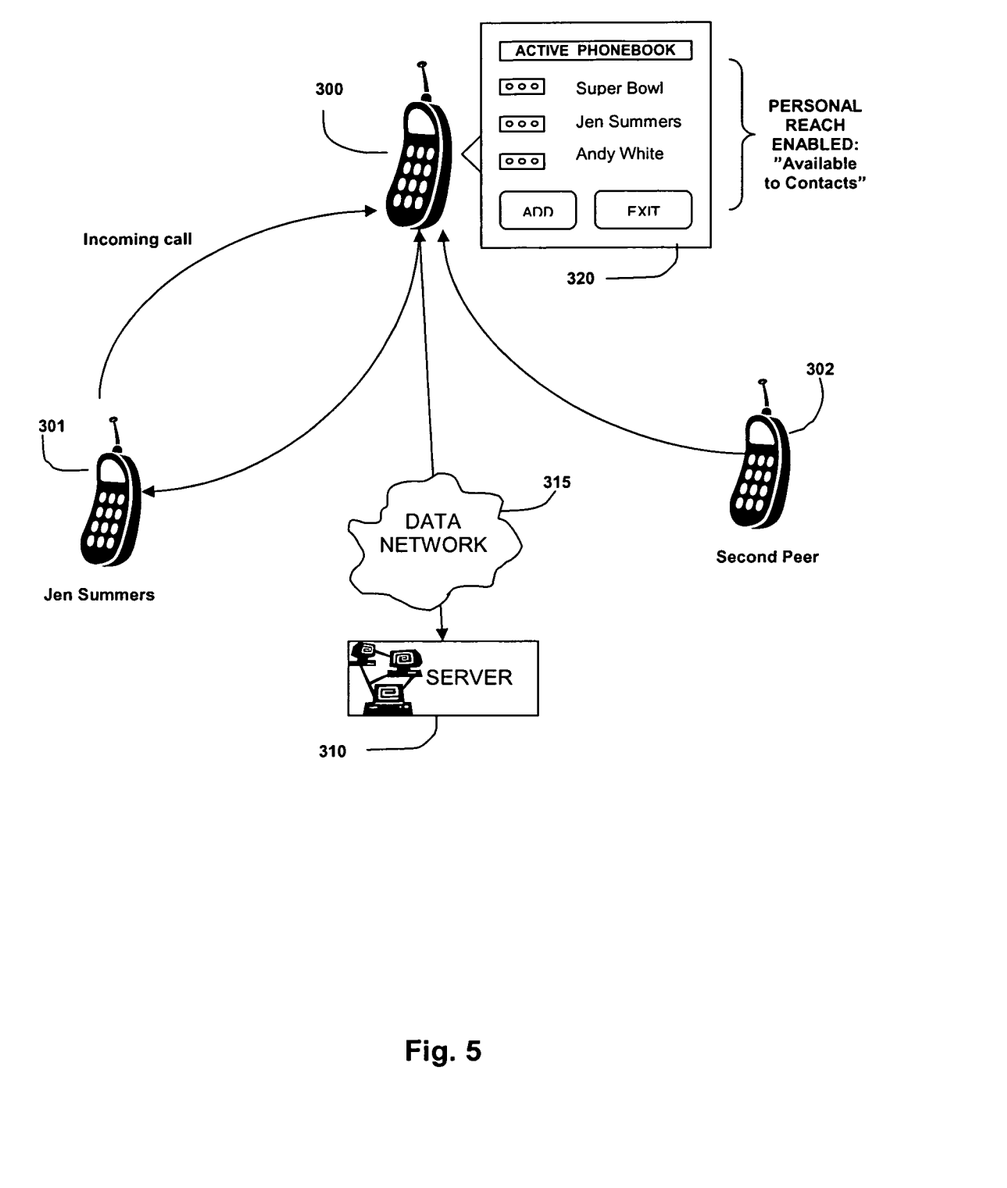
FIG. 5 illustrates yet another exemplary architecture on which one or more embodiments of the present disclosure may be implemented.

FIG. 5 illustrates another exemplary architecture on which one or more embodiments of the present disclosure may be implemented. In the embodiment shown, a first mobile device 300 is running an active phone book application according to the present disclosure, the active phone book including entries for "Super Bowl," "Jen Summers" and "Andy White."

According to some aspects of the present invention, since Jen Summers appears on the first mobile device's active phone book contacts list, Jen Summers can make a call to first mobile device 300 which is allowed to get through, i.e., cause first mobile device 300 to ring to alert the user of the first mobile device that he or she is receiving a call from a member on his or her contacts list. Of course, the indication of the incoming call at first mobile device 300 is not necessarily a ring, but can include a vibration, visual indication, or other notification of the incoming call in real-time or near real-time as known to those skilled in the art.

By contrast, a second peer, not on the first mobile device user's active phone book contacts list is prevented from causing the first mobile device to ring, and is instead "filtered" by software running on the first mobile device 300 and/or server 310, which facilitates calls between first mobile device 300, Jen Summers' mobile device 301, and the second peer mobile device 302. In this way, a user of first mobile device 300 can selectively decide to receive calls only from persons in a designated list such as a contacts list or a subset thereof. The filtered (blocked) calls may be routed to first user's voice mailbox or other messaging means in lieu of going through to the first mobile device 300 or in lieu of making the first mobile device 300 ring or vibrate. This technique will effectively filter out unwanted or lower-priority calls and messages and only pass calls or messages from a selected group of contacts or higher-priority callers. In the case that call filtering is performed on the basis of the caller being on the callee's Contacts List, the technique employs a "Available to Contacts" filter as depicted in the following simplified logic diagram.

Figure 6:
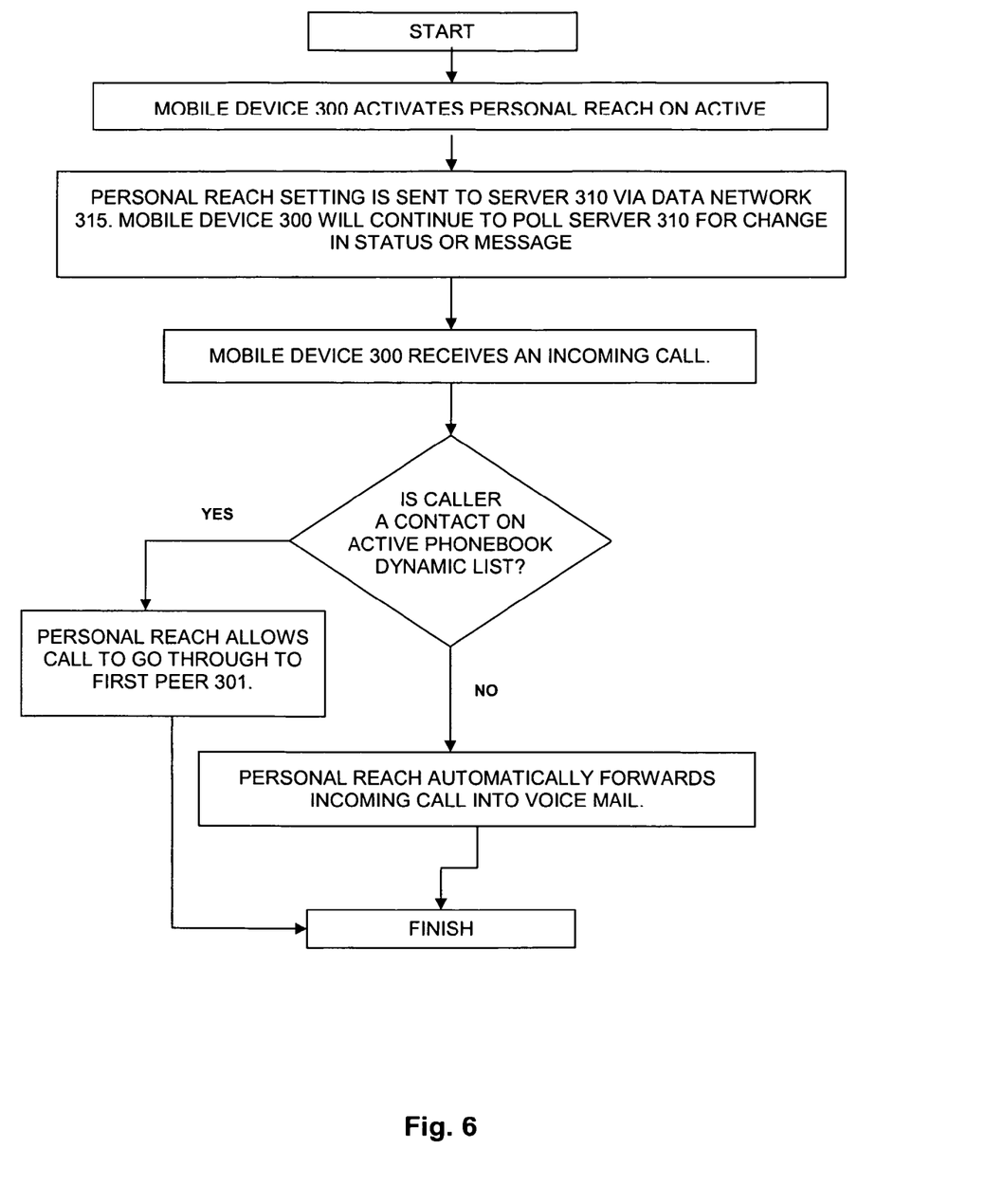
FIG. 6 illustrates a flow diagram for the "Available to Contacts" filtering method.

FIG. 6 illustrates a flow diagram for the "Available to Contacts" filtering described above. First mobile device 300 includes software and hardware to run the communication and messaging software functions described herein. First mobile device 300 and server 310 communicate over data network 315 as described elsewhere in this disclosure. A change in status or reply message is monitored through a polling process.

First mobile device 300 receives an incoming call or message which causes the software to determine whether the caller is a contact of the user of the first mobile device 300 or not. If the caller is a known contact ("YES") then the system allows the call to get through to the first mobile device 300. If the caller is not a known contact ("NO") then the system automatically filters the call by forwarding the call into the user of first mobile device's voice or message box.

Figure 7:
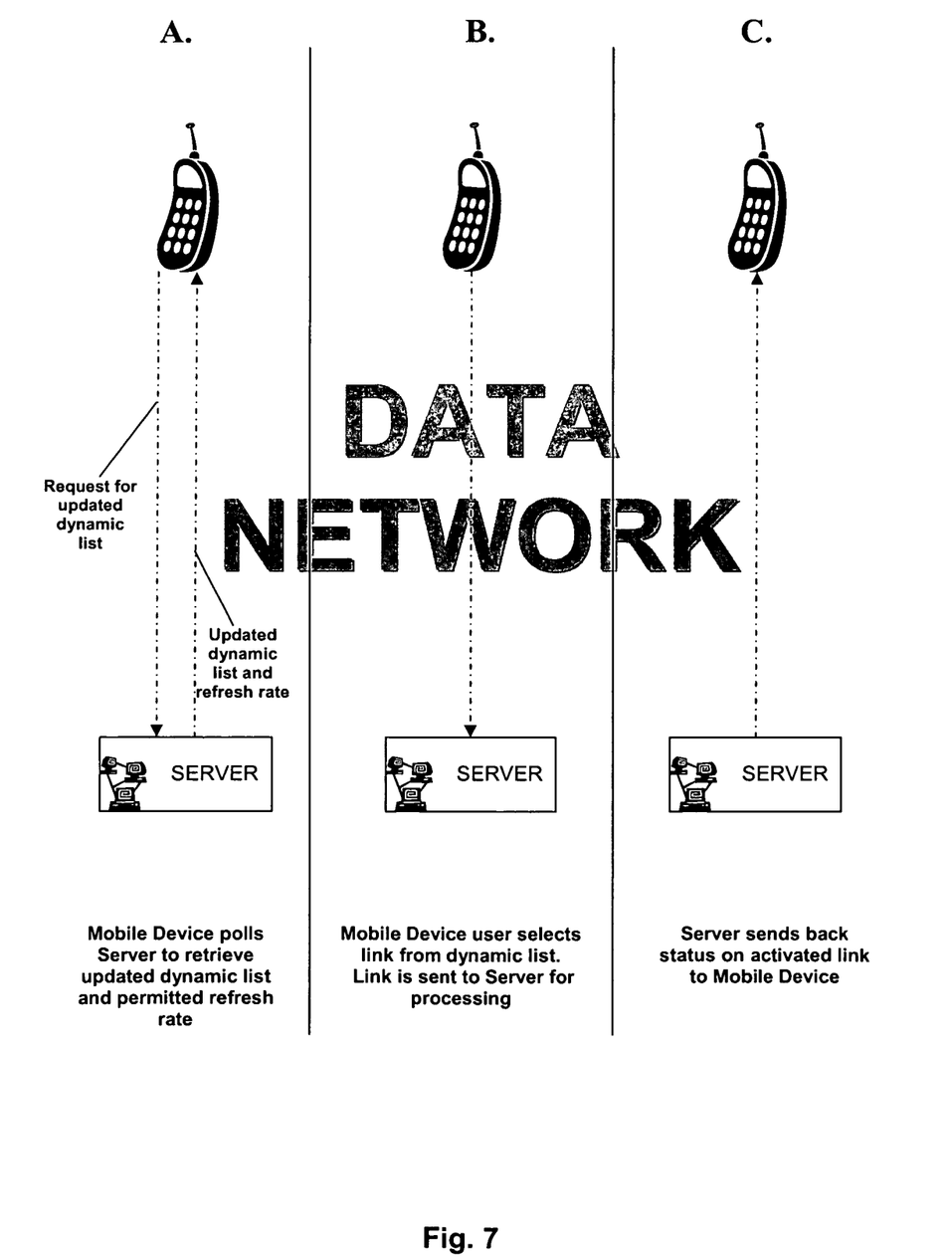
FIG. 7 illustrates a client-server relay that enables one or more embodiments of the active phone book systems and methods.

FIG. 7 illustrates a client-server relay that enables one or more embodiments of the active phone book systems and methods described herein. A client mobile device and a server, as described in earlier sections, are coupled in communication through a data network.

In phase A. of the process shown, polling establishes a connection from the client to the server and from the server to the client by which the server can upload to the client a "live upload" of active phone book information corresponding to that client. This includes, as described earlier, contacts and related connectivity status of the contacts, news information, sports score information, stock quote information, weather information, calendar information, and other dynamically-generated information that can be provided to the client to inform the client's user of the dynamic information and status of the user's contacts on the network. Polling can be accomplished as described elsewhere, and may be initiated, maintained and timed by the client and/or the server to achieve the desired result.

Note that in some embodiments the rate at which the active phone book is updated or "refreshed" can be set by the user of the mobile device or automatically by software running on the mobile device or by an administrator and/or software running on the server. Policies based on a variety of factors can be used to determine the "refresh rate" at which the client's active phone book is refreshed. For example, the client may determine that it is to conserve battery power and thereby be refreshed less frequently. Or the client may determine that it is to maintain an updated active phone book that is more accurate through frequent refreshes at the expense of power consumption.

Other policies, e.g., user subscription level, can be a factor in determining the refresh rate.

In one example, a premium (usually higher-paying) subscriber receives more frequent updates and refreshes of his or her active phone book information, which requires more bandwidth and processing time from the server. By contrast, a lower-level subscriber may receive less frequent updates so that the server and network may conserve their bandwidth and processing resources for other tasks and subscribers.

The client and the user thus remain in contact this way, periodically updating the client's active phone book and populating the appropriate databases with dynamic web content.

In Phase B. of the process, the client (mobile device) selects a given contact or link from its active phone book contacts list (which can include bookmarked links). Said selection can be achieved by controlling an aspect of the mobile client device's hardware and/or software to bring an element of a user interface thereof onto the selected contact to activate or actuate updating of that contact or even/link information. The activation or actuation of a selected contact or link on the client device prompts an exchange between the client device and the server to update at least this portion of the active phone book data.

In Phase C. of the process, the server replies to the client over an activated link to provide the update of the client's active phone book data.

Figure 8:
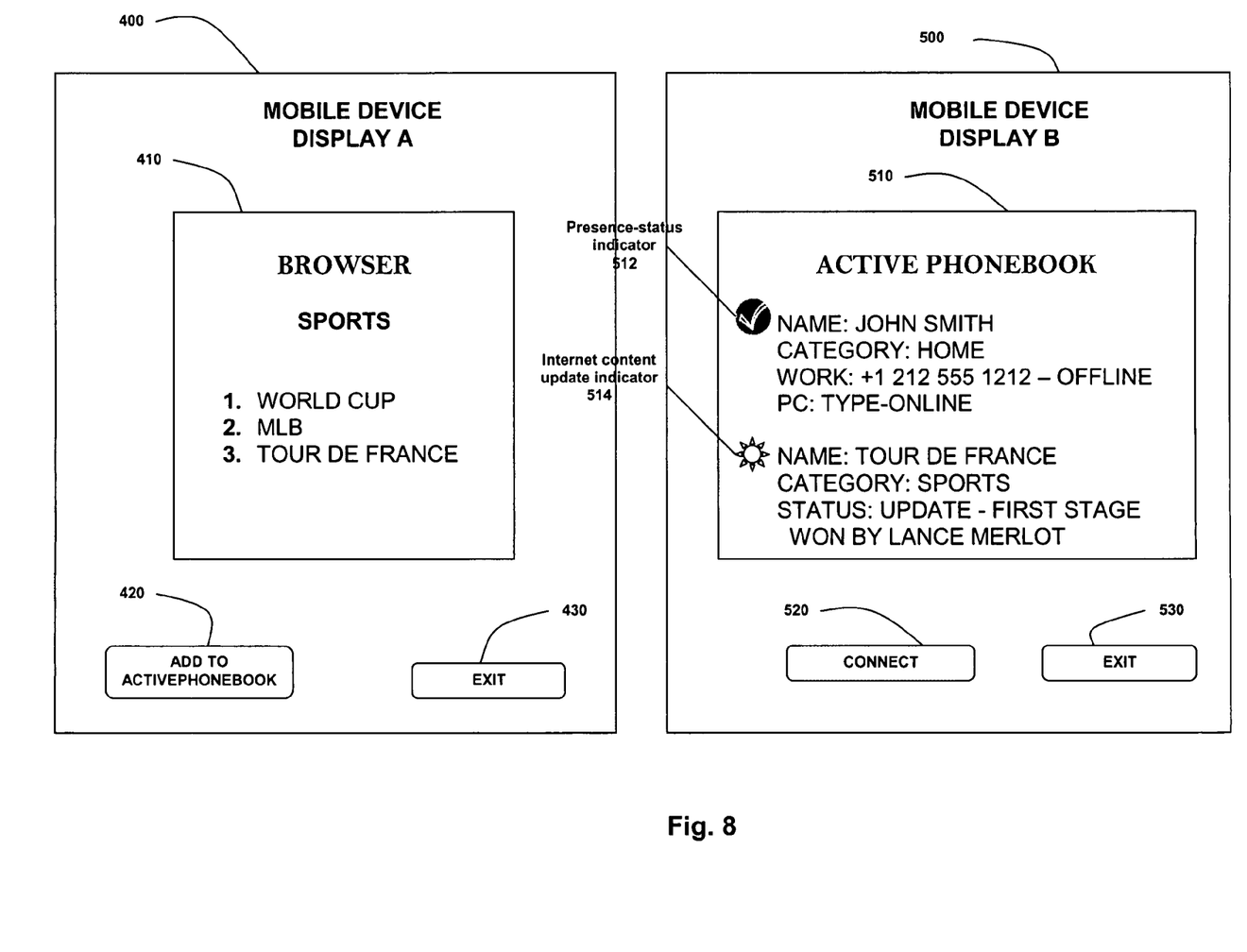
FIG. 8 illustrates an exemplary display of a user interface shown on a client mobile device.

FIG. 8 illustrates an exemplary display of a user interface shown on a client mobile device according to one or more embodiments of the present invention. The exemplary display is merely illustrative of the concepts described herein, and can of course include other information, or be implemented in equivalent or similar ways to achieve the same result as discussed herein.

In the first panel, "Mobile Device Display A," 400, a browser 410 window is shown. The browser window 410 includes information on bookmarked sports events such as "World Cup," "MLB" and "Tour De France." These are selectable by the user of the mobile device using hardware and/or software controls built and running on the mobile device. For example actuating a hardware element on the mobile device, such as a directional controller stick, can cause a selectable entry to be highlighted, moved and selected with the push of a hard or soft button on the mobile device. Once selected, the user can then choose to bookmark the selected link with the "Add to Active Phone Book" button 420. This button can also be a hard or soft button built into the hardware or software of the mobile device. Alternatively, the user can "Exit" the browser screen 410 using the Exit button 430.

In the second panel, "Mobile Device Display B," 500, an Active Phone Book 510 window is shown. The active phone book window 510 includes dynamic information concerning a contact "John Smith" which has a corresponding presence-status indicator 512, and a link "Tour De France," which has a corresponding Internet content (web content) update indicator 514. The indicators for the contacts and for the links, 512 and 514 respectively, can be of different appearance to facilitate easier recognition by the user of the mobile device. Also, the indicators may vary by type of connectivity state, status, and other events that are part of the status of each of the contacts and links.

Each entry in the active phone book 510 may include dynamic and/or static information about that contact or link. For example, as shown in FIG. 8, the contact "John Smith" may have "Category," "Work Number" and "PC Status" information displayed therewith. This dynamic information corresponding to contact John Smith can be updated as necessary. In the case of dynamic links within the active phone book 510, the link (here "Tour De France") can also have dynamic content associated therewith, such as its "Category" and "Status," e.g., indicating the winner of the first stage of the race.

The user can choose to call or activate the active phone book entries using the "Connect" button 520, or to exit the screen with the "Exit" button 530.

Figure 9:
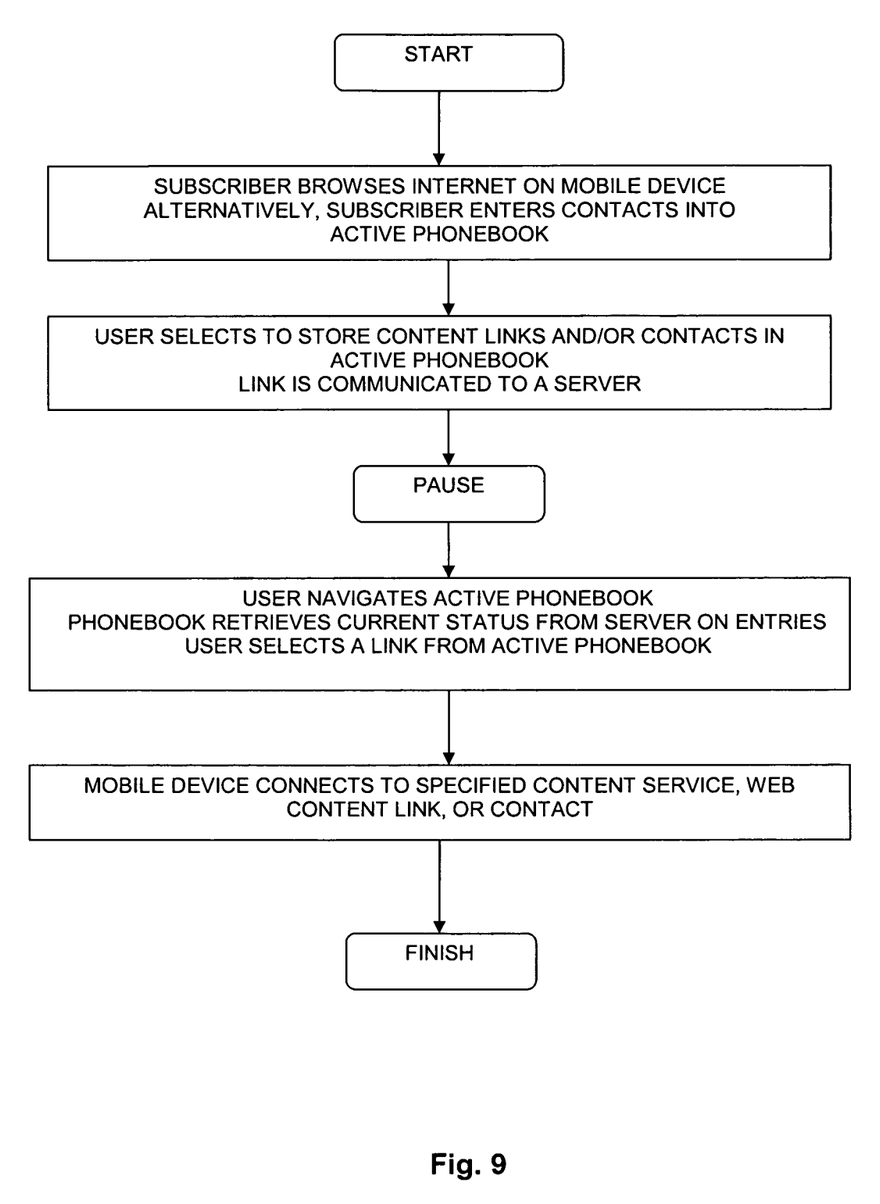
FIG. 9 illustrates an exemplary method for using the systems disclosed herein.

FIG. 9 illustrates an exemplary method for using the system described above. A user of a mobile device, which is a subscriber to a set of functions from his or her carrier, including web browsing and active phone book features is provided with menu options.

The present disclosure is not intended to be limited by its preferred embodiments, and other embodiments are also comprehended and within its scope. For example, a dynamic (active) phone/address book can include a list of people (contacts) that can easily be browsed from and connect to, including the people a user emails with and calls. Traditionally, this is a static list, consisting of names and addresses only. The present active phone book is broader and much more powerful. The present active phone book can contain a list of devices as well as people. In addition, the present active phone book can include meta information about the devices and people using the devices. This enables a decision making parading shift so that each device and person has knowledge and can make better decisions in their communications activities. Application hereunder are optionally provided and/or enabled by server and/or a service.

The following table helps to illustrate some of the features and aspects of the present inventions with reference to other available contexts:

| | End point | Meta info | Decision |
|---|---|---|---|
| Yellow pages | Data base on the phone connects to vendors phone | Advertisement in updated real time Location based priority (closest Taxi comes up first) | User can browse for clothing shop and decide to go to the sale |
| Phone call (iSkoot) | Mobile telephone to mobile phone or PC | Availability, away message | Not to call and get voice mail. Know where to meet someone who can't take a call |
| Pictures | Phone, to PC or Printer | Availability, ink, device driver | Send a picture to your mothers printer |
| On line content | Blackberry or PC to HD TV or IPOD | Device resolution, available memory, file format supported | Tag something and view it later |

Numerous other embodiments, modifications and extensions to the present disclosure are intended to be covered by the scope of the present inventions as claimed below. This includes implementation details and features that would be apparent to those skilled in the art in the mechanical, logical or electronic implementation of the systems described herein. This also includes uses for such systems that the present disclosure and inventions are capable of being used in.

What is claimed is:

1. A communication system providing communication between a client mobile communication device and a server, the system comprising:

the client mobile communication device having hardware and software to exchange information with other devices over a network and provide a user of said mobile communication device with updated presence information about a plurality of contacts of said mobile device, wherein each of the plurality of contacts is associated with a corresponding of the other devices;

the client mobile communication device including a storage medium that stores data and program instructions and further stores a representation of dynamic phone book data including contact information for each and a representation of links to network content;

the client mobile communication device further comprising a processor that executes the stored program instructions with said stored data;

the client mobile communication device further comprising an interface that simultaneously displays a representation of said dynamic phone book data including said contact information and said presence information, and displays said links to network content in a same application window, wherein the interface further displays an update indicator for at least one of said links to network content indicating a status of the at least one of said links to network content;

wherein said application window is responsive to an application that maintains said dynamic phone book data substantially updated with said presence information that includes an indication of a state of availability of each of said plurality of contacts identified in said dynamic phone book data, said presence information obtained by the client mobile communication device from said other devices over said network.

2. The system of claim 1, further comprising a server coupled to said client mobile communication device, said server including a processor that executes program instructions to communicate with said client mobile communication device and cause selected information corresponding to said dynamic phone book data to be delivered from the server to the client mobile communication device.

3. The system of claim 1, wherein said client mobile communication device is configured to selectively determine which of a plurality of other devices are blocked from activating an alert signal on said client mobile communication device.

4. The system of claim 3, wherein said alert signal includes any of: an audible alert signal, a vibrating alert signal, or a visual alert signal.

5. The system of claim 1, further comprising database data stored on said storage medium, wherein said dynamic phone book data include both updatable contact data and updatable network content data.

6. The system of claim 5, wherein said updatable network content data comprise updateable network content link information representing a state of information corresponding to a link to said information.

7. The system of claim 1, wherein said program instructions comprise instructions to cause the processor to set a user-selectable response message delivered to a caller on the basis of the caller's identity.

8. The system of claim 1, wherein said program instructions comprise instructions to cause the processor to set a user-selectable response message delivered to a caller on the basis of whether said caller was associated with an entry in the user's stored contacts information.

9. A method for communicating with a mobile communication device over a network, comprising:

storing dynamic phone book data on the mobile communication device, said dynamic phone book data containing information including contact information and network content information, said contact information including presence information that includes an indication of a state of availability for each of a plurality of contacts, both of said contact information and said network content information including active content that can change from time to time;

receiving a plurality of response messages from a user, each of said response messages including content that is specifically adapted for a corresponding one of said plurality of contacts and generated by said user;

receiving an incoming communication request from a caller using another communication device over the network;

comparing an identity of either said caller or said other communication device to an entry in said dynamic phone book; and causing, based upon a result of said comparing, a particular one of said received response messages to be sent to said caller using said other communication device, said particular one of said received response messages including content that is generated by said user and is specifically adapted for said caller prior to receiving said incoming communication request.

10. The method of claim 9, further comprising filtering said incoming communication request on the basis of its origin so that it can alternately cause an alert signal on said mobile communication device or be forwarded to a messaging mailbox and not cause an alert signal on said mobile communication device.

11. A method for maintaining a dynamic phone book database, containing both dynamic contact information and dynamic network content information, comprising:

determining a periodicity for checking for updated data corresponding to entries in said dynamic phone book database;

at intervals substantially determined by said periodicity, sending a signal from a mobile communication device to a source of updated information indicative of a request to receive updated phone book information from said source of updated information;

receiving updated dynamic phone book data comprising dynamic contact information that includes presence information, said presence information including an indication of availability of each of at least a portion of a plurality of contacts corresponding to said entries in said dynamic phone book database and receiving dynamic network content information from said source of said updated information;

storing said updated dynamic phone book data in a database on said mobile communication device; and simultaneously presenting a representation of said updated dynamic phone book data, links to said dynamic network content, and an update indicator for at least one of said links to said dynamic network content indicating a status of the at least one of said links to said dynamic network content on a display on said mobile communication device such that a user of said mobile communication device can see said presence information and choose to select an entry from said dynamic phone book for the purpose of delivering a communication to a contact from said dynamic phone book or activate one of said links to said dynamic network content.

12. The method of claim 11, wherein determining said periodicity comprises using a predetermined subscription status of a user to determine said periodicity.

13. The method of claim 11, wherein determining said periodicity comprises using a user-selectable power saving setting to determine said periodicity.

14. The method of claim 11, further comprising selecting one of said dynamic contact information or dynamic network content information to establish a connection to a destination corresponding to said dynamic contact information or dynamic network content information.

15. The method of claim 11, further comprising setting an outgoing message to be sent by said mobile communication device to a caller specifically in response to an identity of said caller or said caller's communication device.

16. The method of claim 11, further comprising setting a user-specific response message to be sent to a subset of persons associated with said dynamic contact information upon arrival of an incoming communication from said subset of persons or their communication devices.

17. The method of claim 11, wherein determining said periodicity is made by said mobile communication device responsive to a user input to said mobile communication device.

18. The method of claim 11, wherein determining said periodicity is made by a server that overrides a request for checking for updated data by said mobile communication device.

19. The method of claim 11, further comprising said mobile communication device initiating a request for updated data from a server.

20. The method of claim 11, further comprising a server initiating delivery of updated data to said mobile communication device.

21. An apparatus for communicating with a mobile communication device over a network, comprising:

a storage medium that stores data and program instructions;

a processor that executes the stored program instructions, the stored program instructions configuring the processor to:

store dynamic phone book data on the mobile communication device, said dynamic phone book data containing information including contact information and network content information, said contact information including presence information that includes an indication of a state of availability for each of a plurality of contacts, both of said contact information and said network content information including active content that can change from time to time;

receive a plurality of response messages from a user, each of said response messages including content that is specifically adapted for a corresponding one of said plurality of contacts and generated by said user;

receive an incoming communication request from a caller using another communication device over the network;

compare an identity of either said caller or said other communication device to an entry in said dynamic phone book; and cause, based upon a result of said comparison, a particular one of said received response messages to be sent to said caller using said other communication device, said particular one of said received response messages including content that is generated by said user and is specifically adapted for said caller prior to reception of said incoming communication request.

22. An apparatus for maintaining a dynamic phone book database, containing both dynamic contact information and dynamic network content information, comprising:

means for determining a periodicity for checking for updated data corresponding to entries in said dynamic phone book database;

means for sending, at intervals substantially determined by said periodicity, a signal from a mobile communication device to a source of updated information indicative of a request to receive updated phone book information from said source of updated information;

means for receiving updated dynamic phone book data comprising dynamic contact information that includes presence information, said presence information including an indication of availability of each of at least a portion of a plurality of contacts corresponding to said entries in said dynamic phone book database, and for receiving dynamic network content information from said source of said updated information;

means for storing said updated dynamic phone book data in a database on said mobile communication device; and means for simultaneously presenting a representation of said updated dynamic phone book data, links to said dynamic network content, and an update indicator for at least one of said links to said dynamic network content indicating a status of the at least one of said links to said dynamic network content on a display on said mobile communication device such that a user of said mobile communication device can see said presence information and choose to select an entry from said dynamic phone book for the purpose of delivery of a communication to a contact from said dynamic phone book or activate one of said links to said dynamic network content.

23. An apparatus for communicating with a mobile communication device over a network, comprising:

means for storing dynamic phone book data on the mobile communication device, said dynamic phone book data containing information including contact information and network content information, said contact information including presence information that includes an indication of a state of availability for each of a plurality of contacts, both of said contact information and said network content information including active content that can change from time to time;

means for receiving a plurality of response messages from a user, each of said response messages including content that is specifically adapted for a corresponding one of said plurality of contacts and generated by said user;

means for receiving an incoming communication request from a caller using another communication device over the network;

means for comparing an identity of either said caller or said other communication device to an entry in said dynamic phone book; and means for causing, based upon a result of said comparison, a particular one of said received response messages to be sent to said caller using said other communication device, said particular one of said received response messages including content that is generated by said user and is specifically adapted for said caller prior to reception of said incoming communication request.

24. A non-transitory computer-readable medium for maintaining a dynamic phone book database, containing both dynamic contact information and dynamic network content information, comprising:

at least one instruction to determine a periodicity for checking for updated data corresponding to entries in said dynamic phone book database;

at least one instruction to send, at intervals substantially determined by said periodicity, a signal from a mobile communication device to a source of updated information indicative of a request to receive updated phone book information from said source of updated information;

at least one instruction to receive updated dynamic phone book data comprising dynamic contact information that includes presence information, said presence information including an indication of availability of each of at least a portion of a plurality of contacts corresponding to said entries in said dynamic phone book database, and to receive dynamic network content information from said source of said updated information;

at least one instruction to store said updated dynamic phone book data in a database on said mobile communication device; and at least one instruction to simultaneously present a representation of said updated dynamic phone book data, links to said dynamic network content, and an update indicator for at least one of said links to said dynamic network content indicating a status of the at least one of said links to said dynamic network content on a display on said mobile communication device such that a user of said mobile communication device can see said presence information and choose to select an entry from said dynamic phone book for the purpose of delivery of a communication to a contact from said dynamic phone book or activate one of said links to said dynamic network content.

25. A non-transitory computer-readable medium for communicating with a mobile communication device over a network, comprising:

at least one instruction to store dynamic phone book data on the mobile communication device, said dynamic phone book data containing information including contact information and network content information, said contact information including presence information that includes an indication of a state of availability for each of a plurality of contacts, both of said contact information and said network content information including active content that can change from time to time;

at least one instruction to receive a plurality of response messages from a user, each of said response messages including content that is specifically adapted for a corresponding one of said plurality of contacts and generated by said user;

at least one instruction to receive an incoming communication request from a caller using another communication device over the network;

at least one instruction to compare an identity of either said caller or said other communication device to an entry in said dynamic phone book; and at least one instruction to cause, based upon a result of said comparison, a particular one of said received response messages to be sent to said caller using said other communication device, said particular one of said received response messages including content that is generated by said user and is specifically adapted for said caller prior to reception of said incoming communication request.

* * * * *